(12) United States Patent
Lederer et al.

(10) Patent No.: US 6,840,234 B2
(45) Date of Patent: Jan. 11, 2005

(54) METHOD AND ARRANGEMENT FOR CHECKING THE TIGHTNESS OF A VESSEL

(75) Inventors: Dieter Lederer, Ludwigsburg (DE); Karl-Bernhard Lederle, Renningen (DE); Sujay Sirur, Bangalore (IN)

(73) Assignee: Robert Bosch, GmbH, Stuttgart (DE)

( * ) Notice: Subject to any disclaimer, the term of this patent is extended or adjusted under 35 U.S.C. 154(b) by 0 days.

(21) Appl. No.: 10/664,942

(22) Filed: Sep. 22, 2003

(65) Prior Publication Data

US 2004/0055369 A1 Mar. 25, 2004

(30) Foreign Application Priority Data

Sep. 20, 2002 (DE) .......................................... 102 43 807

(51) Int. Cl.[7] .............................................. F02M 33/02
(52) U.S. Cl. ...................... 123/520; 123/123; 123/516
(58) Field of Search ................................ 123/520, 516, 123/518, 519, 198 D; 73/118.1, 118.2; 60/283, 285

(56) References Cited

U.S. PATENT DOCUMENTS

| | | | | |
|---|---|---|---|---|
| 5,285,745 A | * | 2/1994 | Husain | ..................... 114/74 R |
| 5,460,143 A | * | 10/1995 | Narita | ......................... 123/520 |
| 5,850,819 A | * | 12/1998 | Kunimitsu et al. | ......... 123/520 |
| 6,220,230 B1 | * | 4/2001 | Kawamura et al. | ......... 123/520 |
| 6,394,074 B1 | * | 5/2002 | Okada et al. | ................ 123/519 |
| 6,460,518 B1 | | 10/2002 | Streib | |

* cited by examiner

Primary Examiner—Mahmoud Gimie
(74) Attorney, Agent, or Firm—Walter Ottesen

(57) ABSTRACT

In order to reduce the influence of the elasticity of components of a vessel (10, 20, 30, 40, 50) and/or of an outgassing of a liquid fluid (11), which is disposed in the vessel (10, 20, 30, 40, 50) or a condensation of a gas disposed in the vessel or of a gas mixture (12) on an underpressure or an overpressure in the vessel, a gas mass flow is controlled to obtain a constant underpressure or overpressure in the vessel. In this way, a leak of the vessel can be detected with great reliability and the size of the leak can be computed with great accuracy. The vessel is especially a vessel of a tank system and tank-venting system of a motor vehicle having an internal combustion engine. In the event that a gas mass flow adjusts, which is constant in average, and which is greater than a pregivable limit value, a conclusion is drawn as to the presence of a leak. The size of the leak is computed from a signal characterizing the constant gas mass flow.

14 Claims, 3 Drawing Sheets

METHOD AND ARRANGEMENT FOR CHECKING THE TIGHTNESS OF A VESSEL

BACKGROUND OF THE INVENTION

To check the tightness of a fluid-filled vessel, the vessel is charged with an underpressure or an overpressure. The vessel can, for example, be part of a tank system of a motor vehicle having an internal combustion engine. In the event that a leakage is present, fluid flows through the locations of non-tightness to the vessel or out of the vessel whereby the underpressure or overpressure is reduced. This underpressure reduction or overpressure reduction functions as an index for the size of the leak.

For example, in the tank system of a motor vehicle having an internal combustion engine, a mixture, especially of fuel vapor and air, is drawn from the tank-venting system by suction because of an underpressure in an intake manifold of the engine. For this purpose, a tank-venting valve is opened between the intake manifold and the tank system. To prevent fresh air from flowing after into the tank system, a fresh air feed line of the tank system is closed by a check valve. The tank-venting valve is thereupon closed and the underpressure in the tank system is detected by a pressure sensor mounted in the tank system. In the event a leakage is present in the tank system, ambient air can flow into the tank system which leads to a reduction of underpressure.

A method for checking tightness of a tank system of a vehicle is disclosed in U.S. Pat. No. 6,460,518. In this method, the underpressure is built up by means of a pump.

Elastic components of the tank system and especially the tank itself can be deformed because of the underpressure or overpressure whereby the underpressure or overpressure is reduced in the tank system. This operation is characterized also as a creep operation and takes place only once for each component during an underpressure build up or overpressure build up.

With a build up of the underpressure, a part of the fluid disposed in the vessel (especially of a fuel) passes from the liquid phase into the gaseous phase in order to compensate for the quantity drawn off in the gaseous phase. The outgassing likewise leads to a reduction of underpressure. The outgassing reduces with increasing vaporized fluid quantity up to reaching a pressure equilibrium. This outgassing takes place in dependence upon a fluid vapor pressure and a partial pressure of the gaseous fluid.

When charging the vessel filled with the fluid with an underpressure or overpressure, the outgassing or condensation of the fluid disposed in the vessel and/or the deformation of elastic components of the vessel lead to a reduction of the underpressure or overpressure whereby the accuracy of the tightness check is limited.

SUMMARY OF THE INVENTION

It is an object of the invention to provide a method and an arrangement for checking the tightness of a vessel especially of a tank-venting system of a motor vehicle having an internal combustion engine. In the method and arrangement, the influence of the elasticity of the components of the vessel and/or of the outgassing of a liquid fluid, which is disposed in the vessel, or a condensation of a gas or gas mixture disposed in the vessel on an underpressure or an overpressure in the vessel is so reduced that, independently upon the sequence of physical and/or chemical processes, a leakage of the vessel is detectable with great reliability and the size of the leakage can be determined with great accuracy.

According to the invention, the vessel is charged by a pressure source with a pregiven constant underpressure or overpressure. The pressure source is controlled so that, for a leakage, an air mass flow, which is constant in average, is adjusted through the leak. In order to maintain the underpressure or overpressure constant, the pressure source is charged with an actuating quantity constant on the average. The size of the leak can be computed from the actuating quantity.

The method of the invention for checking the tightness of a vessel (especially of a tank system and tank-venting system of a motor vehicle having an internal combustion engine) provides that the gas mass flow to reach a constant underpressure or overpressure is controlled and, in the case that a gas mass flow constant on the average is adjusted, which is greater than a pregiven limit value, a conclusion as to a leakage can be drawn. In the method, each supply and discharge to the vessel is blocked and the vessel is charged with a pregiven underpressure or overpressure relative to atmospheric pressure and the underpressure or overpressure and a first signal are detected. This signal characterizes the gas mass flow required for this and especially an air mass flow. It is advantageous here that a constant gas mass flow adjusts only when there is a leak because the gas mass flow for maintaining the underpressure or overpressure must be continuously readjusted. The underpressure reduction because of the outgassing and/or a deformation (especially a shrinkage of elastic components of the vessel, especially of a tank) or of the overpressure reduction because of the condensation of the gas or gas mixture and/or an expansion of the elastic components of the vessel reduces with time. In order to not diagnose a slight pressure reduction (because of a slight outgassing or slight condensation) erroneously as a leak, it is advantageous to only draw a conclusion as to a leak when the constant gas mass flow is greater than the limit value.

This limit value is advantageously pregiven in dependence upon the elasticity of the vessel and/or of the residual vaporization of the fluid or the residual condensation of the gas in the vessel whereby the accuracy of the tightness check is significantly increased.

Advantageously, the pumping or conveying power of a pressure source anyway already available is readjusted to maintain the underpressure or overpressure.

In a vessel having a venting valve, especially having a tank-venting valve, in a connection to an intake manifold, especially of an internal combustion engine, the underpressure can be advantageously controlled very easily by a change of the passthrough of the venting valve and a conclusion can be drawn from an actuating quantity as to a leakage or the size thereof can be computed. The venting valve is charged with this actuating quantity.

The arrangement of the invention provides that the pressure source can be controlled for maintaining a pregiven underpressure or overpressure, which is constant on average, and that the size of the leak can be computed from the actuating quantity with which the pressure source can be charged for the control. With the use of a controllable pressure source, it is possible to maintain the underpressure or overpressure constant independently of the outgassing or of the condensation and/or of the elasticity of the components of the vessel.

The pressure source is preferably controlled by a control unit, especially by an engine control apparatus anyway available whereby additional components are unnecessary.

Advantageously, the pressure source is an electromagnetically driven pump. The pump current of the pump can be very easily determined as an actuating quantity.

BRIEF DESCRIPTION OF THE DRAWINGS

The invention will now be described with reference to the drawings wherein.

DESCRIPTION OF THE PREFERRED EMBODIMENTS OF THE INVENTION

The method of the invention is described hereinafter with respect to the tank systems shown in FIGS. 1 and 2. The tank system has a tank 10 in a motor vehicle having an internal combustion engine. The method is not limited to a tank 10 of a motor vehicle; rather, the invention can be applied for a tightness check in any desired vessel or tank system for various fluids, especially fuels and especially tank-venting systems of tank systems in different areas, for example, in vessels utilized in the chemical industry.

Figure 1:
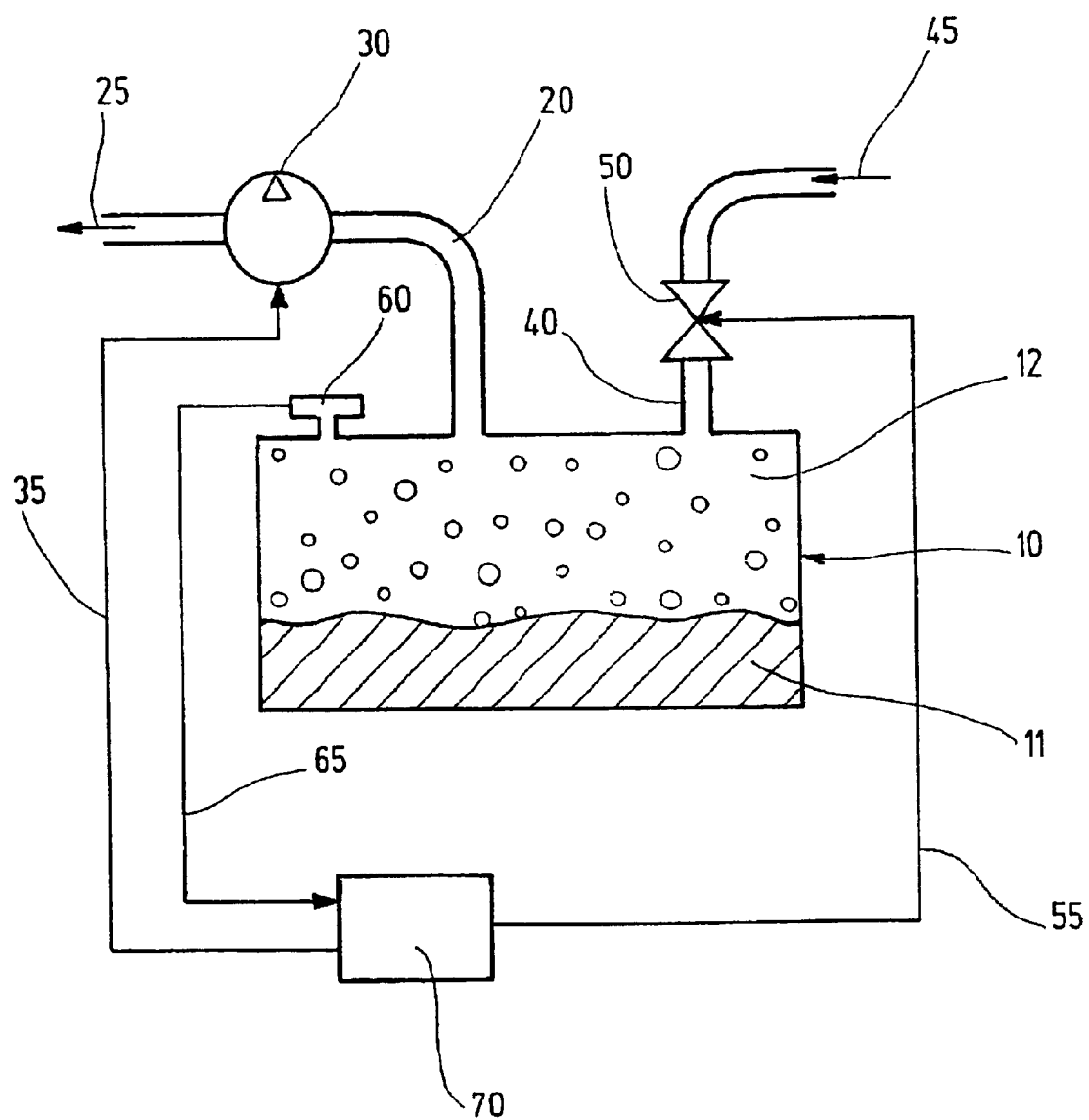
FIG. 1 is a schematic of a first embodiment of a tank system having an underpressure pump which is used in the method of the invention.

The tank 10 shown schematically in FIG. 1 is to be checked with respect to tightness. The tank 10 includes a fresh-air supply channel 40 wherein a controllable check valve 50 is mounted. Fresh air can flow to the tank 10 in the direction of arrow 45 through this fresh-air supply channel 40. Furthermore, the tank 10 includes a discharge channel 20 wherein an electromagnetically driven underpressure pump 30 is mounted. In lieu of the pump 30, a mechanically and/or hydraulically operated underpressure source can, for example, be provided.

With the pump 30, a gas mixture can be drawn by suction in the direction of arrow 25 from the tank 10 and through the discharge channel 20. The pump 30 can be driven and controlled by a control unit 70 (especially an engine control apparatus) via a control line 35. The check valve 50 can be controlled by the control unit 70 via a control line 55 to open and close.

Furthermore, the tank 10 includes a pressure sensor 60 with which the pressure in the tank 10 can be detected. The pressure sensor 60 can be mounted also at another location in the tank system at which the same pressure is present. A signal of the pressure sensor 60 is transmitted to the control unit 70 via a signal line 65.

In lieu of with the pressure sensor 60, the pressure can be determined, for example, from any operating quantity of the tank system and/or of the pump 30 which characterizes the pressure sensor.

As shown by way of example in FIG. 1, the tank 10 is filled at least partially with fuel 11. The gas mixture 12 is disposed above the fuel 11. The gas mixture 12 includes especially fuel vapor and air. The tank 10 can also be filled exclusively with the gas mixture 12.

In a second embodiment shown in FIG. 2, those elements, which are described in FIG. 1 with respect to the first embodiment and are identical, are provided with the same reference numerals so that reference to the description thereof is made hereinafter. This embodiment is different from the first embodiment in that a controllable tank-venting valve 30' is provided in lieu of the pump 30. With the tank-venting valve 30', a gas mass flow through the discharge channel 20 can be controlled. The discharge channel 20 is connected to an intake manifold (not shown) of the internal combustion engine. During operation of the engine, the gas mixture 12 is drawn by suction from the tank 10 in the direction of arrow 25 via the underpressure in the intake manifold with the tank-venting valve 30' being open at least partially.

Figure 2:
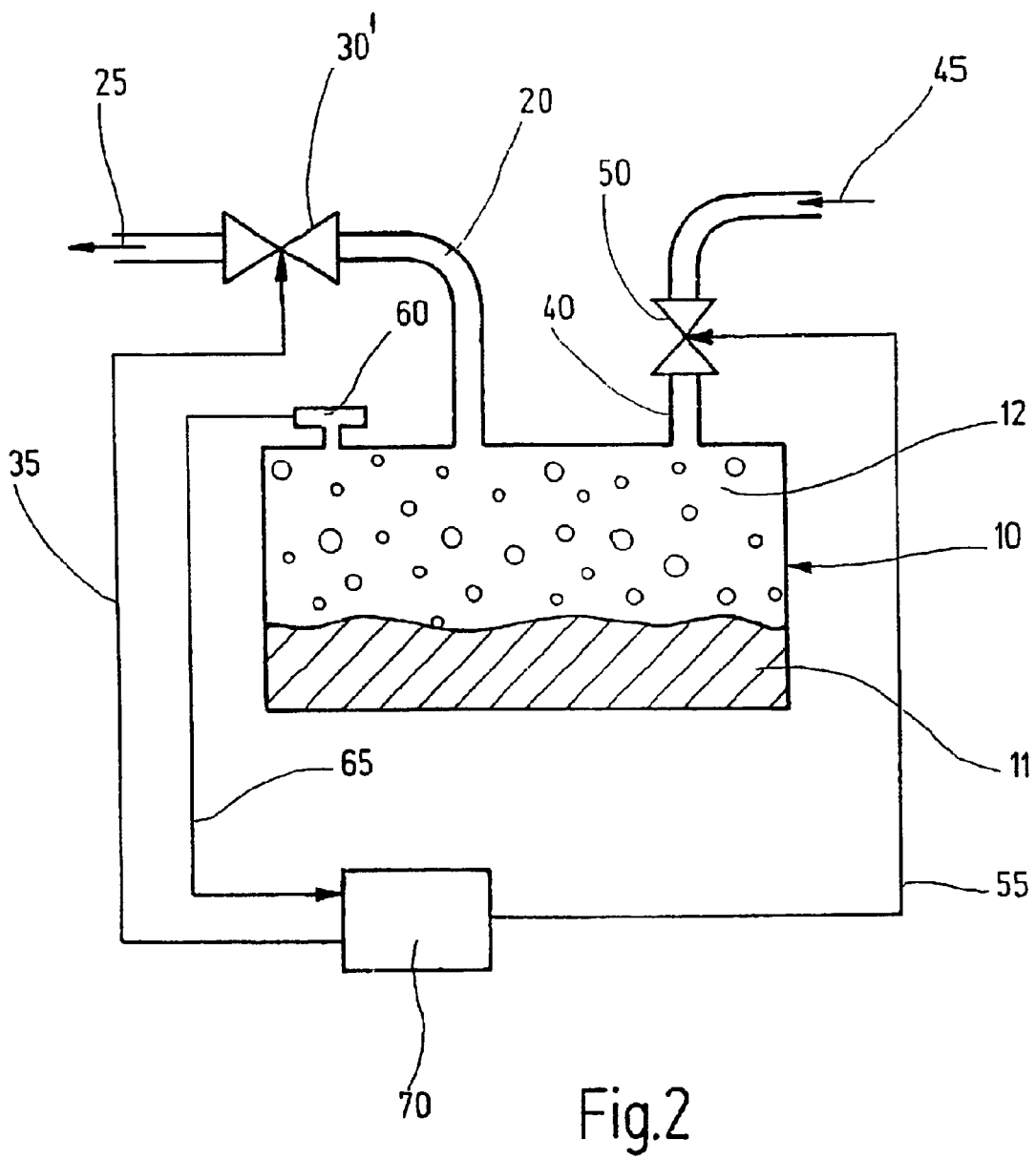
FIG. 2 is a schematic of a second embodiment of another tank system having a tank-venting valve which is utilized in the method of the invention; and, FIG. 3 is a sequence diagram of a tightness check in a tank system of FIG. 1 or 2.

An underpressure builds up in the tank system, especially in the tank 10, when the check valve 50 is closed and the gas mixture 12 is drawn off by suction through the discharge channel 20 by the pump 30 (FIG. 1) or via an opening of the tank-venting valve 30' (FIG. 2).

Figure 3:
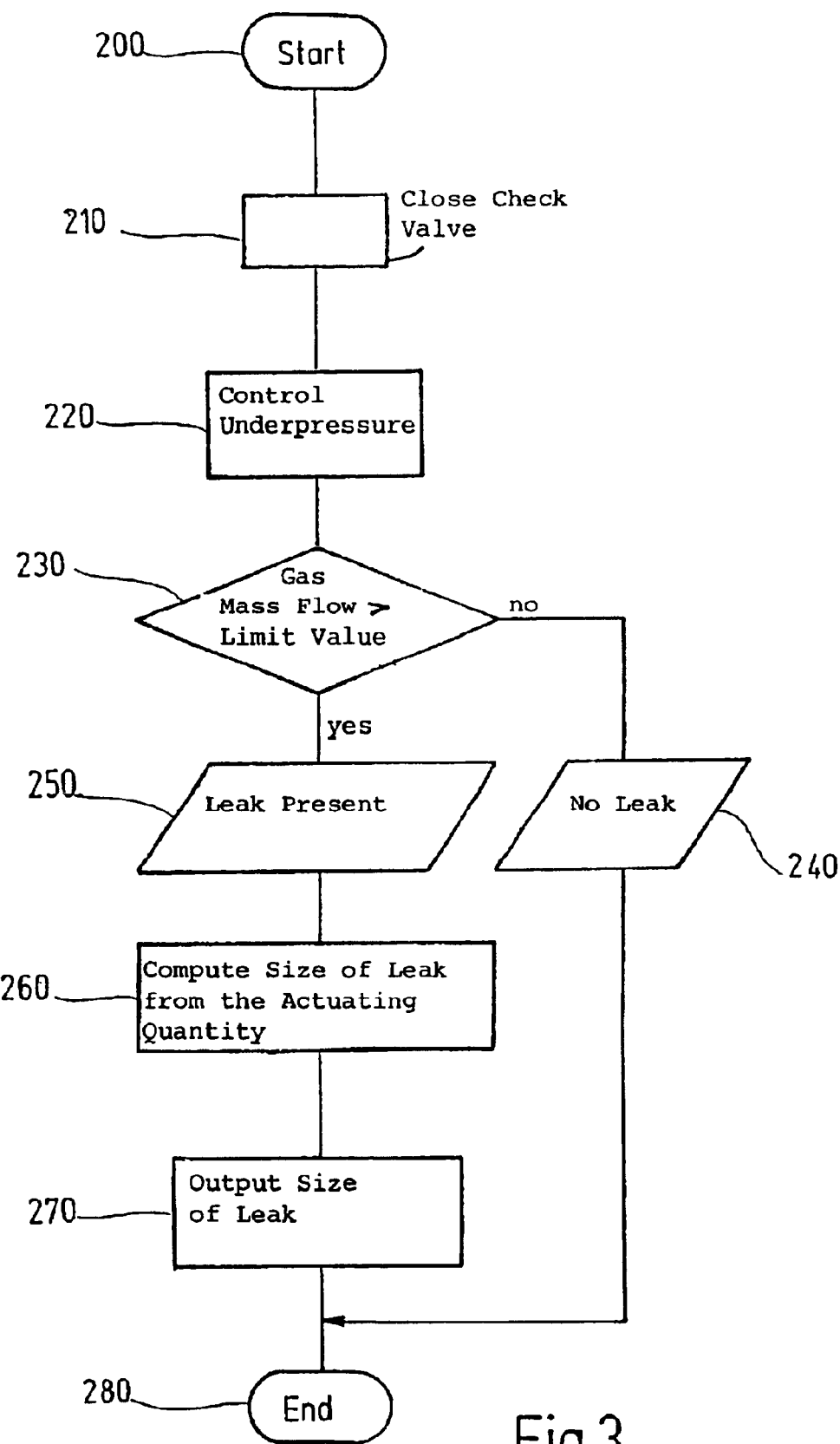

The method is started with step 200 as shown in FIG. 3 in order to carry out the tightness check of the invention.

At the start, the check valve 50 is closed in step 210 so that the fresh-air supply channel 40 is blocked and no fresh air can flow into the tank 10. Thereafter, the control of the underpressure in tank 10 takes place in step 220. For this purpose, the pump 30 or the tank-venting valve 30' is driven and the underpressure in tank 10 is built up. The pump 30 is driven as described in connection with FIG. 1 and the tank-venting valve 30' is driven as described with respect to FIG. 2. The underpressure is controlled to a pregiven constant value which can be pregiven, for example, by the manufacturer.

With this control operation, an underpressure reduction because of an outgassing of the fuel 11 and/or because of a deformation (for example, by a shrinkage of elastic components of the tank system) is compensated. A reduction of the gas mass flow takes place therefore as a function of time and this can be detected because of a drop in the pumping capacity of the pump 30, which is necessary to maintain the underpressure, or by a reduction of the passthrough of the tank-venting valve 30'.

If a leak is in the tank system, then an air mass flow, which is constant in average, settles in through the leak because of the constant-controlled underpressure as soon as the outgassing of the fuel 11 is almost ended. A residual vaporization of the fuel 11 makes only a slight contribution to the underpressure reduction.

The elastic components do not shrink any further so that, in this way, no further underpressure reduction takes place. The gas mass flow through the discharge channel 20 is essentially the constant air mass flow in the steady state condition.

The pump 30 or the tank-venting valve 30' are driven by an actuating quantity, which is constant in average, in the steady state. This actuating quantity is determined in a manner known per se in the control unit 70 from a signal for the pressure in the tank 10 which was determined with the pressure sensor 60. The actuating quantity is, for example, the pumping current. The actuating quantity can, however, also be an rpm or the like. An electromagnetically driven tank-venting valve 30' can, for example, be driven in a clocked manner. The clock frequency is then the actuating quantity.

In step 230, a check is made as to whether the gas mass flow is greater than a pregivable limit value which was previously experimentally determined and is, for example, given by the manufacturer and which is characteristic for the physical and/or chemical characteristics of the tank system or of the fuel 11, for example, characteristic for the residual vaporization of the fuel 11. If the gas mass flow is not greater than the pregiven limit value, then a conclusion can be drawn in step 240 that no leak is present, that is, especially no air can flow in from the ambient through a leak. Thereafter, the method is ended in step 280.

In contrast, if it is determined in step 230 that the gas mass flow is greater than the pregiven limit value, then a conclusion is drawn in step 250 that leakage is present. Thereupon, in step 260, the size of the leak is computed from the actuating quantity determined in step 220.

The computed size of the leak is transmitted in step 270 to an output unit (not shown) or to the control unit 70.

Thereafter, the method is ended in step 280.

In lieu of an underpressure, an overpressure can be built up in tank 10. For this purpose, appropriate overpressure sources are required in lieu of the pump 30 or of the tank-venting valve 30'. In lieu of the outgassing, a condensation of the gas mixture 12 can then be compensated.

It is understood that the foregoing description is that of the preferred embodiments of the invention and that various changes and modifications may be made thereto without departing from the spirit and scope of the invention as defined in the appended claims.

What is claimed is:

1. A method for checking the tightness of a vessel including a tank system and a tank venting system of a motor vehicle having an internal combustion engine, the method comprising the steps of:

blocking any supply to and discharge from said vessel;

applying an overpressure or underpressure relative to atmospheric pressure to said vessel;

detecting a signal which characterizes a gas mass flow required for this purpose;

controlling said gas mass flow in order to obtain a constant overpressure or underpressure; and, when a gas mass flow, which is constant in average, adjusts, drawing a conclusion as to the presence of a leakage when said gas mass flow is greater than a pregiven limit value.

2. A method for checking the tightness of a vessel including a tank system and a tank venting system of a motor vehicle having an internal combustion engine, the method comprising the steps of:

blocking any supply to and discharge from said vessel;

applying an overpressure or underpressure relative to atmospheric pressure to said vessel;

detecting a signal which characterizes a gas mass flow required for this purpose;

controlling said gas mass flow in order to obtain a constant overpressure or underpressure;

when a gas mass flow, which is constant in average, adjusts, drawing a conclusion as to the presence of a leakage when maid gas mass flow is greater than a pregiven limit value; and, wherein said limit value is pregiven in dependence upon the elasticity of said vessel and/or a residual condensation of at least a component of a gas mixture in said vessel.

3. A method for checking the tightness of a vessel including a tank system and a tank venting system of a motor vehicle having an internal combustion engine, the method comprising the steps of:

blocking any supply to and discharge from said vessel;

applying an overpressure or underpressure relative to atmospheric pressure to said vessel;

detecting a signal which characterizes a gas mass flow required for this purpose;

controlling maid gas mass flow in order to obtain a constant overpressure or underpressure;

when a gas mass flow, which is constant in average, adjusts, drawing a conclusion as to the presence of a leakage when said gas mass flow is greater than a pregiven limit value; and, wherein the magnitude of said leakage is computed from said signal characterizing the constant gas mass flow.

4. A method for checking the tightness of a vessel including a tank system and a tank venting system of a motor vehicle having an internal combustion engine, the method comprising the steps of:

blocking any supply to and discharge from said vessel;

applying an overpressure or underpressure relative to atmospheric pressure to said vessel;

detecting a signal which characterizes a gas mass flow required for this purpose;

controlling said gas mass flow in order to obtain a constant overpressure or underpressure;

when a gas mass flow, which is constant in average, adjusts, drawing a conclusion as to the presence of a leakage when said gas mass flow is greater than a pregiven limit value; and, wherein the pumping capacity of a pressure source is changed to control said gas mass flow; and, a quantity, which characterizes said pumping capacity, is detected as said signal characterizing said gas mass flow.

5. The method of claim 4, wherein an actuating quantity for driving said pressure source is computed in dependence upon a pressure signal; and, the magnitude of said leakage is determined from said actuating quantity.

6. A method for checking the tightness of a vessel including a tank system and a tank venting system of a motor vehicle having an internal combustion engine, the method comprising the steps of:

blocking any supply to and discharge from said vessel;

applying an overpressure or underpressure relative to atmospheric pressure to said vessel;

detecting a signal which characterizes a gas mass flow required for this purpose;

controlling said gas mass flow in order to obtain a constant overpressure or underpressure;

when a gas mass flow, which is constant in average, adjusts, drawing a conclusion as to the presence of a leakage when said gas mass flow is greater than a pregiven limit value; and, wherein the through-flow quantity through a venting valve is controlled for charging said vessel with said underpressure; and, the quantity characterizing said through-flow quantity is determined as said signal characterizing maid gas mass flow.

7. The method of claim 6, wherein said venting valve is a tank-venting valve.

8. The method of claim 6, wherein an actuating quantity for driving said venting valve is computed in dependence upon a pressure signal and the magnitude of said leakage is determined from said actuating quantity.

9. An arrangement for checking the tightness of a vessel including a tank system and tank venting system of a motor vehicle having an internal combustion engine, the arrangement comprising:

a check valve for blocking a supply to and a discharge from said vessel;

a pressure source for applying a pregiven overpressure or underpressure to said vessel relative to atmospheric pressure;

means for controlling said pressure source to hold a pregiven overpressure or underpressure constant in average;

said control means including means for applying an actuating quantity to said pressure source for controlling said pressure source; and, means for computing the size of said leakage from said actuating quantity.

10. The arrangement of claim 9, wherein said control means includes a control unit for controlling said pressure source.

11. The arrangement of claim 10, wherein said control unit is an engine control apparatus.

12. The arrangement of claim 9, wherein said pressure source is an electromagnetically operated pump having a pump current which is said actuating quantity.

13. The arrangement of claim 9, wherein said pressure source is a venting valve having a passthrough which is controllable for controlling said underpressure.

14. The arrangement of claim 13, wherein said venting valve is a tank-venting valve.

* * * * *

UNITED STATES PATENT AND TRADEMARK OFFICE
CERTIFICATE OF CORRECTION

PATENT NO. : 6,840,234 B2
DATED : January 11, 2005
INVENTOR(S) : Dieter Lederer, Karl-Bernhard Lederle and Sujay Sirur It is certified that error appears in the above-identified patent and that said Letters Patent is hereby corrected as shown below:

Column 5,
Lines 48 and 64, delete "maid" and insert -- said -- therefor.

Column 6,
Line 49, delete "maid" and insert -- said -- therefor.

Signed and Sealed this

Tenth Day of May, 2005

JON W. DUDAS
*Director of the United States Patent and Trademark Office*